(12) United States Patent
Saavedra

(10) Patent No.: US 9,264,307 B2
(45) Date of Patent: *Feb. 16, 2016

(54) SYSTEM, APPARATUS AND METHOD FOR PROVIDING IMPROVED PERFORMANCE OF AGGREGATED/BONDED NETWORK CONNECTIONS BETWEEN REMOTE SITES

(71) Applicant: TELOIP INC., Mississauga (CA)

(72) Inventor: Patricio Humberto Saavedra, Toronto (CA)

(73) Assignee: TELOIP INC., Mississauga, Ontario (CA)

( * ) Notice: Subject to any disclaimer, the term of this patent is extended or adjusted under 35 U.S.C. 154(b) by 205 days.

This patent is subject to a terminal disclaimer.

(21) Appl. No.: 13/958,009

(22) Filed: Aug. 2, 2013

(65) Prior Publication Data
US 2014/0040442 A1    Feb. 6, 2014

Related U.S. Application Data

(63) Continuation-in-part of application No. 13/420,938, filed on Mar. 15, 2012, now Pat. No. 8,913,610, which is a continuation of application No. 12/269,439, filed on Nov. 12, 2008, now Pat. No. 8,155,158.

(51) Int. Cl.
*H04L 12/24* (2006.01)
*H04L 12/28* (2006.01)
(Continued)

(52) U.S. Cl.
CPC ........ *H04L 41/0816* (2013.01); *H04L 12/2867* (2013.01); *H04L 45/245* (2013.01); *H04L 69/14* (2013.01); *H04L 2012/5624* (2013.01); *Y02B 60/33* (2013.01)

(58) Field of Classification Search
USPC .................. 709/218, 219, 221, 225, 232, 234
See application file for complete search history.

(56) References Cited

U.S. PATENT DOCUMENTS

| 5,617,417 A | 4/1997 | Sathe et al. |
| 5,764,740 A | 6/1998 | Holender |

(Continued)

FOREIGN PATENT DOCUMENTS

| CN | 1897492 A | 1/2007 |
| EP | 0910195 A2 | 4/1999 |

(Continued)

OTHER PUBLICATIONS

IP Australia, Office Action dated Jul. 25, 2014, issued on Australian Patent Application No. 2009316197.
(Continued)

*Primary Examiner* — Kim T Nguyen
(74) *Attorney, Agent, or Firm* — Norton Rose Canada Fulbright LLP

(57) ABSTRACT

A networking system, method, and device is provided for improving network communication performance between client sites at a distance from one another such that would usually require long haul network communication. The networking system includes at least one network bonding/aggregation computer system for bonding or aggregating one or more diverse network connections so as to configure a bonded/aggregated connection that has increased throughput; and at least one network server component implemented at an access point to a high performing network. Data traffic is carried over the bonded/aggregated connection. The network server component automatically terminates the bonded/aggregated connection and passes the data traffic to the network backbone, while providing a managed network path that incorporates both the bonded/aggregated connection and a network path carried over the high performing network, and thereby providing improved performance in long haul network connections.

20 Claims, 8 Drawing Sheets

(51) Int. Cl.
  *H04L 12/709* (2013.01)
  *H04L 29/06* (2006.01)
  *H04L 12/70* (2013.01)

(56) References Cited

U.S. PATENT DOCUMENTS

| | | | |
|---|---|---|---|
| 5,809,070 | A | 9/1998 | Krishnan et al. |
| 6,002,670 | A | 12/1999 | Rahman et al. |
| 6,262,976 | B1 | 7/2001 | McNamara |
| 6,621,859 | B1 | 9/2003 | Bell et al. |
| 6,778,495 | B1 | 8/2004 | Blair |
| 7,167,860 | B1 | 1/2007 | Black et al. |
| 7,177,284 | B2 | 2/2007 | Peleg et al. |
| 7,630,412 | B2 | 12/2009 | Wright et al. |
| 7,646,708 | B2 | 1/2010 | McGee et al. |
| 7,843,843 | B1 | 11/2010 | Papp, III et al. |
| 8,155,158 | B2 | 4/2012 | Saavedra |
| 2002/0114276 | A1 | 8/2002 | Basturk |
| 2004/0213386 | A1 | 10/2004 | Gupta |
| 2005/0030974 | A1 | 2/2005 | Wright et al. |
| 2006/0098573 | A1* | 5/2006 | Beer et al. ............ 370/230 |
| 2006/0176900 | A1 | 8/2006 | Liu et al. |
| 2006/0215689 | A1 | 9/2006 | Liu et al. |
| 2008/0075111 | A1 | 3/2008 | Hu et al. |
| 2008/0080371 | A1 | 4/2008 | Liu et al. |
| 2009/0182874 | A1 | 7/2009 | Morford et al. |
| 2010/0046536 | A1 | 2/2010 | Wright et al. |
| 2011/0013569 | A1* | 1/2011 | Scherzer et al. ............ 370/329 |
| 2011/0081955 | A1 | 4/2011 | Lange et al. |
| 2013/0064255 | A1 | 3/2013 | Saavedra |
| 2015/0003465 | A1* | 1/2015 | Saavedra ............ 370/401 |

FOREIGN PATENT DOCUMENTS

| | | |
|---|---|---|
| WO | 2004/043013 A1 | 5/2004 |
| WO | 2006095273 A1 | 9/2006 |
| WO | 2006100610 A1 | 9/2006 |
| WO | 2010/054475 A1 | 5/2010 |
| WO | 2014/135216 A1 | 9/2014 |

OTHER PUBLICATIONS

Patent Cooperation Treaty, Written Opinion and International Search Report dated Oct. 17, 2014, issued on PCT Application No. PCT/CA2014/000595.

Canadian Intellectual Property Office, Office Action dated Apr. 14, 2014, issued on Canadian Patent Application No. 2,743,548.
State Intellectual Property Office, Office Action dated Aug. 23, 2013, issued on Chinese Patent Application No. 200980149872.1 (english translation provided).
State Intellectual Property Office, Office Action dated Apr. 30, 2014, issued on Chinese Patent Application No. 2009801498721 (english translation provided).
European Patent Office, Extended European Search Report dated Jan. 3, 2013, issued on European Patent Application No. 09825684.5.
United States Patent and Trademark Office, Office Action Summary dated Apr. 29, 2014, issued on U.S. Appl. No. 13/420,938.
United States Patent and Trademark Office, Office Action Summary dated Jun. 27, 2014, issued on U.S. Appl. No. 13/420,938.
United States Patent and Trademark Office, Office Action Summary dated Jul. 19, 2013, issued on U.S. Appl. No. 13/420,938.
Norton Rose Fulbright Canada LLP, Office Action Response dated Oct. 21, 2013, filed on U.S. Appl. No. 13/420,938.
Mushroom Networks, Inc.; Mushroom Networks; http://www.mushroomnetworks.com/product.aspx?product_id=1000&tab=features; p. 1-2; 2004-2008.
Internet Engineering Task Force; The PPP Multilink Protocol; http://www.ietf.org/rfc/rfc1990.txt?number=1990; Aug. 1, 1996.
United States Patent and Trademark Office, Office Action Summary dated Apr. 9, 2010, issued on U.S. Appl. No. 12/269,439.
Miller Thomson LLP, Office Action Response dated Sep. 30, 2010, filed on U.S. Appl. No. 12/269,439.
United States Patent and Trademark Office, Office Action Summary dated Dec. 7, 2010, issued on U.S. Appl. No. 12/269,439.
Miller Thomson LLP, Office Action Response dated Jun. 7, 2011, filed on U.S. Appl. No. 12/269,439.
United States Patent and Trademark Office, Office Action Summary dated Jun. 23, 2011, issued on U.S. Appl. No. 12/269,439.
Miller Thomson LLP, Office Action Response dated Nov. 10, 2011, filed on U.S. Appl. No. 12/269,439.
Patent Cooperation Treaty, International Search Report and Written Opinion dated May 27, 2015 for PCT Application No. PCT/CA2014/000694.
IP Australia, Notice of Acceptance dated Aug. 6, 2015 issued in Australian application No. 2009316197.
IP Australia, Office Action dated Jun. 17, 2015 issued in related Australian application No. 2014295861.
United States Patent & Trademark Office, Office Action dated Jul. 2, 2015 issued in related U.S. Appl. No. 14/489,036.

* cited by examiner

SYSTEM, APPARATUS AND METHOD FOR PROVIDING IMPROVED PERFORMANCE OF AGGREGATED/BONDED NETWORK CONNECTIONS BETWEEN REMOTE SITES

PRIORITY

This application is a continuation-in-part of U.S. patent application Ser. No. 13/420,938, filed on Mar. 15, 2012, which is a continuation application of U.S. Pat. No. 8,155,158, which are incorporated by this reference.

FIELD OF THE INVENTION

The present invention relates generally to network communications and, in particular, to aggregating or bonding communications links so as to improve network performance such as Cable, DSL, T1, or Metro Ethernet, so as to improve network performance or quality of services in regards to a variety of different networks including wired and wireless networks, and including Wide Area Networks ("WAN").

BACKGROUND

While the capacity of network connections has increased since the introduction of dial up, high speed connectivity is not ubiquitous in all regions. Also, bandwidth is not an unlimited resource and there is a need for solutions that improve the utilization bandwidth and also that address network performance issues.

Various solutions exist for improving network performance such as load balancing, bonding of links to increase throughput, as well as aggregation of links. In regards to bonding/aggregation various different technologies exist that allow two or more diverse links (which in this disclosure refers to links associated with different types of networks and/or different network carriers) are associated with one another for carrying network traffic (such as a set of packets) across such associated links to improve network performance in relation for such packets.

Examples of such technologies include load balancing, WAN optimization, or ANA™ technology of TELoIP™, as well as WAN aggregation technologies.

Many of such technologies for improving network performance are used to increase network performance between two or more locations (for example Location A, Location B, Location N or the "Locations"), where bonding/aggregation of links is provided at one or more of such locations. While the bonded/aggregated links provide significant network performance improvement over the connections available to carry network traffic for example from Location A to an access point to the backbone of a network (whether an Internet access point, or access point to another data network such as a private data network or high performance wireless network) ("network backbone"), the bonded/aggregated links are generally slower than the network backbone.

Prior art technologies including bonding/aggregation generally result in what is often referred to as "long haul" bonding/aggregation, which means that the bonded/aggregated links are maintained for example from Location A and Location B, including across the network backbone, which in many cases results in network impedance. As a result, while bonding/aggregation provides improved network performance for example from Location A to the network backbone, network performance across the entire network path for example from Location A to Location B, may be less than optimal because the technology in this case does not take full advantage of the network performance of the network backbone.

There is a need for a system and method that addresses at least some of these problems.

SUMMARY OF THE INVENTION

In one aspect, a networking system is provided for improving network communication performance between at least a first client site and a second client site, where the first client site and the second client site are at a distance from one another that is such that would usually require long haul network communication, comprising: (A) at least one network bonding/aggregation computer system that includes: (i) at least one client site network component that is implemented at least at a first client site, the client site network component bonding or aggregating one or more diverse network connections so as to configure a bonded/aggregated connection that has increased throughput; and (ii) at least one network server component, configured to interoperate with the client site network component, the network server component including a server/concentrator that is implemented at an access point to a high performing network; wherein the client site network component and the network server component are configured to interoperate so as to create and maintain a network overlay for managing network communications between the at least first client site and the access point, wherein between the client site network component and the network server component data traffic is carried over the bonded/aggregated connection and between the access point and the second client site the network server component automatically terminates the bonded/aggregated connection and passes the data traffic to the associated network backbone, while maintaining management of data traffic so as to provide a managed network path that incorporates both at least the bonded/aggregated connection and at least one network path carried over the high performing network, and thereby providing improved performance in long haul network connections between the first client site and the second client site.

In another aspect, the first client site and the second client site are at a distance from one another such that data traffic over a bonded/aggregated connection between the first client site and the second client site is subject to long haul effects.

In another aspect, the managed network path is maintained between at least a first client site and a second client site without routing of network communications through a central server that increases long haul effects.

In another aspect, the plurality of network server components are implemented in a geographic area so as to provide a Point-of-Presence (PoP), which are made available to proximate client site network components.

In a still another aspect, the two or more Points-of-Presence are accessible to the at least one client site network component, and the client site network component: collects network performance information; and initiates the configuration of the network overlay to include one or more network server components so as to improve network communication performance.

In another aspect, a computer implemented method for improving network communication performance between at least two sites, is provided where the two sites are at a distance from one another that is such that would usually require long haul network communication, comprising: (A) using a client site network component associated with a first client site to connect to a proximal network server component, the network server component being connected to an access point to a high performing network, forming thereby a network overlay that provides a bonded or aggregated connections for carrying data packets; (B) the network server component terminating the bonded or aggregated connection; and (C) the network server component transferring the data packets to the high performing network, for delivery to a second client site, while maintaining management of data traffic so as to provide a managed network path that incorporates at least the bonded/aggregated connection and at least one network path carried over the high performing network, thereby reducing long haul effects.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Examples of embodiments of the invention will now be described in greater detail with reference to the accompanying drawings, in which:

FIG. 1a illustrates the problem of long haul aggregation/bonding.

DETAILED DESCRIPTION

In one aspect, a novel and innovative system, network architecture and networking method is provided.

In another aspect of the present invention, a network solution is provided for improving network communication performance between at least two sites, where the two sites are at a distance from one another that is such that would usually require long haul network communication. The network solutions includes at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access point to a high performing network backbone.

In one aspect, the first network component, may be implemented using what is called in this disclosure a "CPE" or customer premises equipment (also referred to as client site network component). The CPE and a server/concentrator component (more fully described below) interoperate to configure the bonded/aggregated connections in order to provide improve network connections at a site associated with the CPE.

In one aspect of the present invention, the server/concentrator is implemented at an access point, with access to the network backbone so as to avoid long-haul bonded/aggregated network communications. As set out in the Example in Operation cited below, network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent), based on bonding/aggregation between the CPE and an associated server/concentrator (or equivalent), overall performance may be less than desired and in fact may be less than what would be available without bonding/aggregation because of the long haul effects of carrying the bonded/aggregated from Site A, to at least Site B. These long haul effects will present wherever Site A and at least Site B are at a substantial distance from one another.

The Example in Operation below illustrates the decrease in performance that results from the long haul effects.

Figure 1A:
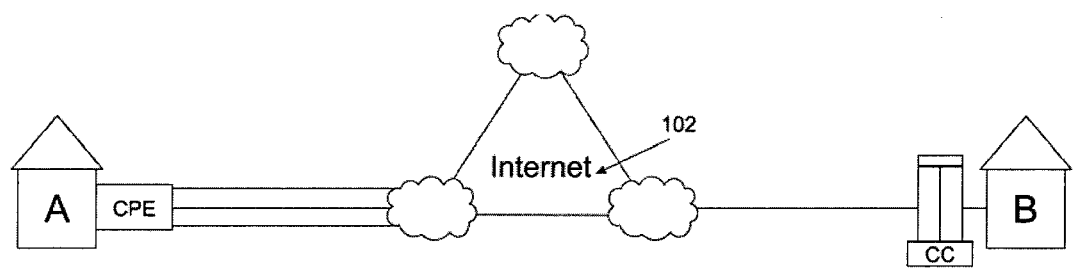
FIG. 1a illustrates a prior art network configuration that includes a bonded/aggregated network connection.

FIG. 1a illustrates the problem of long haul aggregation/bonding generally. In the prior art bonded/aggregated network communication shown in FIG. 1a, packets are carried over the Internet through an extension of the bonded/aggregated connection across the Internet (102), rather than the high performing Internet. The bonded/aggregated connection, across a distance that is subject to long haul effects, will not perform as well as the Internet, thereby providing less than ideal performance.

Figure 1B:
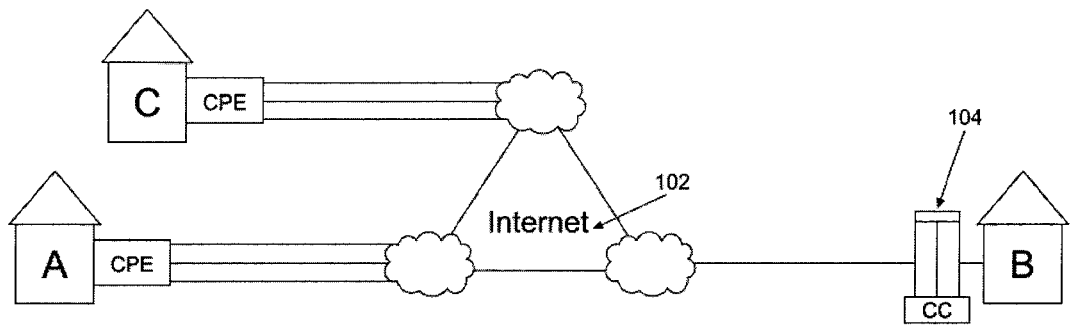
FIG. 1b also illustrates a prior art network configuration that includes central management of bonded/aggregated network connections.

The Example in Operation reflects another problem with prior art bonding/aggregation solutions, namely that they generally require control or management by a central server. Depending on the location of the central server, this can result in multiplying of the long haul effects because traffic between a Site A and Site B may need to also be transferred to a Site C that is associated with the central server. This aspect of the invention is illustrated for example in FIG. 1b. Central server (104) manages network communications, and in fact routes network communications between Site A and Site C. To the extent that the distance between central server (104) is substantial from either of Site A or Site C, long haul effects will present. If central server (104) is at a substantial distance from each of Site A and Site C, then there will be a multiplying of the long haul effects, as network traffic will pass from Site A to the central server (104) to Site C, and from Site C to the central server (104) to Site A.

As illustrated in the Example of Operation, long haul effects have a negative impact on speed (slowing traffic) and also on latency. Conversely, the present invention provides significant improvements in regards to both speed and latency.

The present invention provides a novel and innovative network solution, including a networking system and architecture and associated networking method, that addresses the aforesaid long haul effects that have a negative effect on performance.

Figure 2A:
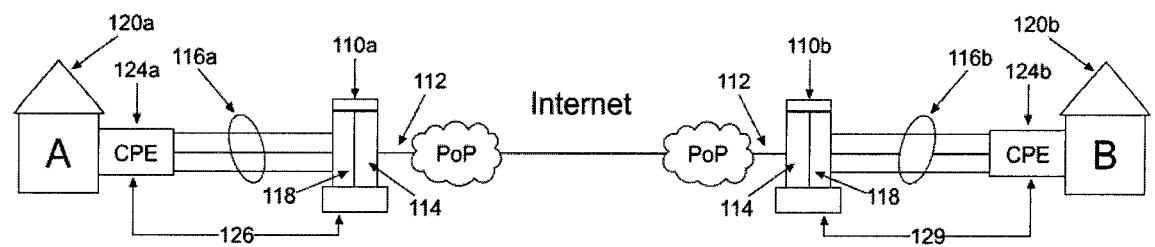
FIG. 2a shows a network solution in accordance with the present invention, with bonding/aggregation implemented at both Site A and Site B, while minimizing long haul effects based on the technology of the present invention.

As shown in FIG. 2a, in one aspect of the invention, the server/concentrator side of a bonding/aggregation network solution for Site A (120a) is implemented such that (A) the location of the server/concentrator is implemented with access to the network backbone of Internet (112), and (B) the server/concentrator (110a) includes functionality for (i) receiving packets by means of the bonded/aggregated connection (116a), (ii) interrupting the bonded/aggregated connection (116a) using an interruptor (118), and (iii) directing the packets (114) to the Internet (112) for delivery to a Site B (120b). If Site B also has bonded/aggregated network service, then the packets are delivered to a Site B side server/concentrator (110b). Server/concentrator (110b) established a further bonded/aggregated connection (116b) and directs the packets (114) via the bonded/aggregated connection (116b) to a CPE(B) (124b) at Site B.

Figure 2B:
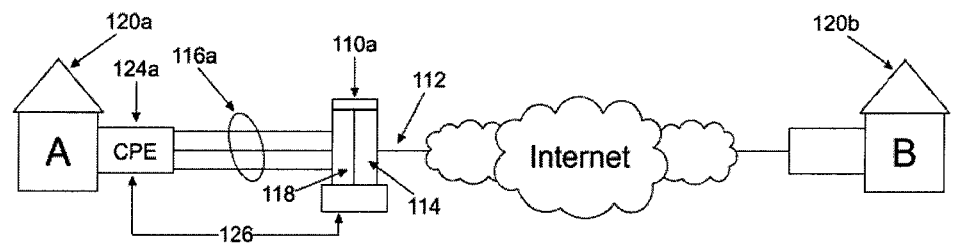
FIG. 2b shows another network solution in accordance with the present invention, in which bonded/aggregated network service exists at Site A but not at Site B.

FIG. 2b illustrates a configuration where bonded/aggregated network service exists at Site A but not at Site B.

Figure 2C:
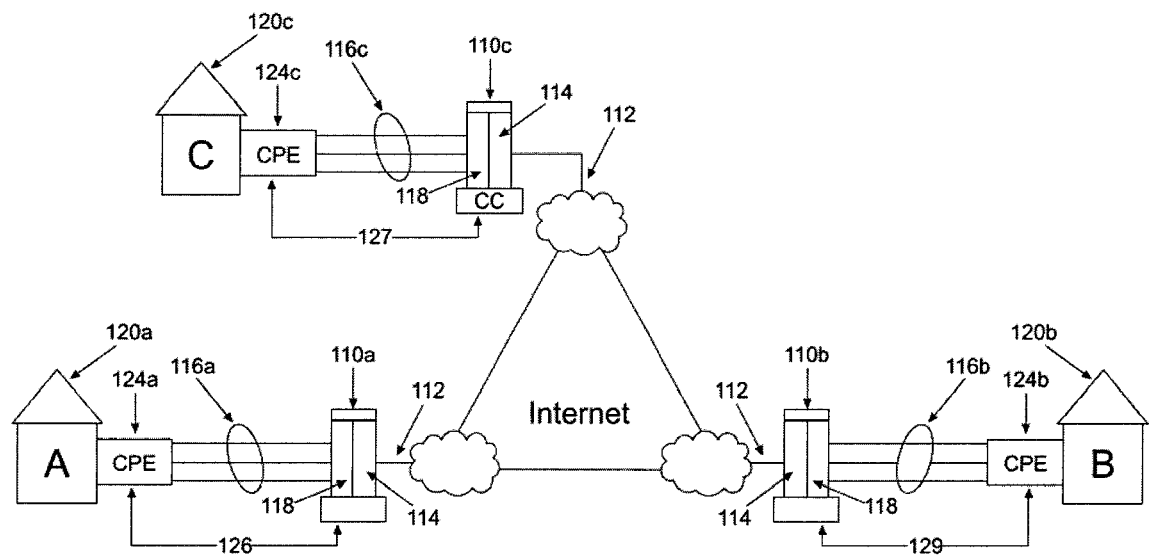
FIG. 2c shows a still other network solution in accordance with the present invention, in which bonding/aggregation is implemented as between Site A, Site B, and Site C.

A skilled reader will understand that more than two sites are possible, where the network system of the present invention improves network performance for network communications between for example Site A, Site B, and Site C where one or more sites will include bonded/aggregated service. In one implementation of the invention, as shown in FIG. 2c, bonded/aggregated service is present for each of Site A, Site B and Site C. FIG. 2c illustrates one possible implementation of the invention, where the network system is based on a distributed network architecture where server/concentrators (110a) (110b) (110c) and corresponding CPEs (124a) (124b) (124c) are configured to provide improved network communications, including interruption of network communications at the network backbone so as to reduce long haul effects, dynamically and on a peer to peer basis without the need for a persistent central manager. In one implementation, each of the network components of the network system included functionality to operate on a peer to peer basis.

A CPE (124) initiates network communications on a bonded/aggregated basis, cooperating with a server/concentrator (110), with packets destined for a remote location. Each server/concentrator (110) receives dynamic updates including a location and identifier associated with other server/concentrators (110). Packets are dynamically sent to a server/concentrator (110) at the remote location, if available, and from the server/concentrator (110) at the remote location to its CPE (124). The CPEs (124) and their server/concentrators (110) use bi-directional control of network communications to establish a network overlay to provide improved network performance. The network overlay for example provides desirable quality of service despite underlying network conditions that may otherwise resulted in a decrease in network performance.

In accordance with the present invention, the network system of the present invention establishes and manages two or more network overlays. Referring for example to FIG. 2a a first network overlay (126) is established between the CPE (A) (124a) and server/concentrator (110a); then, communications are transferred over the Internet (112) without a network overlay; then, a second network overlay (129) is established between server/concentrator (110b) and CPE(B) (124b). As a result, IP transport is provided between Site A and Site B where this will provide better performance than the aggregated/bonded network connections. Bonding/aggregation in effect is distributed across the locations, rather than attempting to span the distance between the locations with end to end bonding/aggregation.

The present invention therefore provided distributed bonding/aggregation. The present invention also provides a network system that automatically provides distributed bonding/aggregation in a way that bonding/aggregation is proximal, and beyond proximal connections IP transport is used, with proximal bonded/aggregated connections and fast Internet being used as part of end-to-end improved service.

Figure 2D:
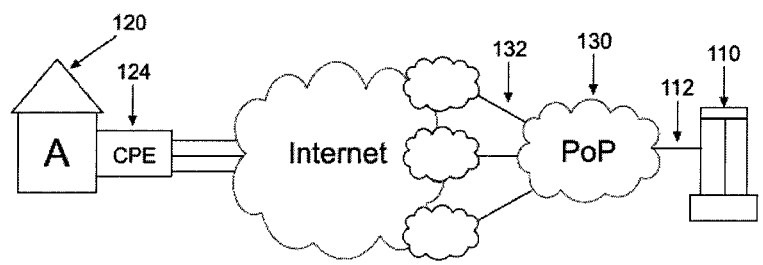
FIG. 2d shows a further implementation of the network architecture of the present invention, in which a plurality of servers/concentrators are implemented as part of a Point-of-Presence.

In another aspect of the invention, and as shown in FIG. 2d, one or more server/concentrators can be implemented at a physical location, as part of a Point-of Presence (PoP) (130). In one aspect, in the context of the present invention, a PoP (130) can define a relatively high concentration of servers/concentrators within an area. In another aspect, a plurality of PoPs (130) may be available in a geographic location. A plurality of PoPs (130) may be established based on network topology or service requirements in a given area.

In one aspect, each PoP (130) has one or more network backbone connections (132), because in some locations different network backbones may be available. The PoP (130) may be implemented so that it dynamically interoperates with surrounding networks. The PoP (130) is a collection of network components, established at the periphery of the network backbone (112), associated with a plurality of networks, and cumulatively providing network communication service to a one or more clients in a defined geographic area. In one possible implementation, the server/concentrators (110) located within the PoP (130) functions as a network access server for connecting to the Internet (112). The network access server (110) acts as the access point to the Internet (112) for a plurality of CPE devices (124) that are connected to the PoP (130). The servers/concentrators (110) may be configured to communicate with one another to share information regarding network conditions. Servers/concentrators (110) provide connectivity to CPEs (124) and may also run a networking protocol such as BGP to route servers and other network backbone connections (112).

In one aspect, servers/concentrators (110) are configured to detect changes in their network environment.

The CPE (124) may be configured to collect information from network components in its vicinity including from one or more available PoPs (130) and their servers/concentrators (110). The CPE (124) for example connects to a closest available server/concentrator (124), implemented as part of a PoP (130), and thereby having access to a connection to the network backbone (112). Whether the connection to the network backbone (112) is direct or indirect, the network connections are established so as to minimize long haul effects.

In one implementation, each CPE (124) wanting to establish a connection dynamically advertises its IP address, and receives replies from associated servers/concentrators (110) along with their current network performance information. The CPE (124) initiates a bonded/aggregated connection with a server/concentrator (110) that is both proximal (to minimize long haul effects between the CPE (124) to the network backbone (112)), and also that based on network conditions relevant to the particular server/concentrator, is performing well.

In one implementation, a network device is deployed that bonds or aggregate multiple, diverse links. The network device may be WAN aggregator or a link aggregator.

Once the network overlay is established, various other network optimization and quality of services ("QOS") techniques may be applied.

One or more CPEs and one or more concentrators can create various different network configurations that improve network performance in relation to network communications between them. The CPEs and concentrators are designed to be self-configuring, and to interoperate with one another to manage traffic in a more effective way.

"Proximal" means a distance such that based on relevant network conditions, long haul network communication and associated effects are avoided. The distance between the CPE and the server/concentrator is proximal, thereby enabling good network service.

A skilled reader will also understand that in order to take advantage of the network architecture of the present invention, the server/concentrator (110) should be located at an access point to the network backbone (112) or in some other way to minimize the long haul effect, for example, by the server/concentrator being located proximal to an access point so as to further avoid long haul network communication.

In another aspect, the bonded/aggregated connection at Site A and the bonded/aggregated connection at Site B may be different, in the sense that each may include different types of network connections and that may be associated with different carriers. In one aspect of the invention, the network overlay provided operates notwithstanding such diversity.

The more sites that have the CPE/concentrators associated with them the better network performance between them. Representative performance details are included below.

The network backbone (112) could be any high performance network including for example a private WAN, the Internet, or an MPLS network.

Network Overlay

In one aspect of the invention, one or more network overlays are established in accordance with the present invention, thereby in one aspect providing a multi-POP network that exploits multiple points of presence so as to provide a persistent, configurable/reconfigurable network configuration that provides substantial network performance improvements over prior art methods.

In one aspect of the invention, the CPEs/concentrators may monitor network performance, including in the areas proximate to their position, and may reconfigure the network overlay dynamically, across multiple locations (including multiple PoPs) based on changes in network performance while providing continuity of service.

In one aspect, the network components of the present invention are intelligent, and iteratively collect network performance information. Significantly, in one aspect each CPE is able to direct associated concentrator(s) and any CPE to in aggregate re-configure the network overlay.

Significantly, in the network overlay created by the present invention management of the network may be centralized or decentralized, depending on the configuration that provides the best overall performance. This is in contrast to prior art solutions that generally require central management for example of termination of connection which results in traffic being carrier over bonded/aggregated connection that involve long haul transmission that fail to take advantage of network paths that may provide inherently better performance than the bonded/aggregated connection paths.

In one aspect, decentralized managed is made possible by peer-to-peer functionality implemented to the network components of the present invention.

In another aspect of the invention, a plurality of servers/concentrators may be established in multiple locations covering a plurality of different access points. Each server/concentrator may be used for multiple clients associated with different CPEs to improve network performance for such multiple clients by providing termination of their bonded/aggregated connection and transfer of communications to the network backbone. The network solution of the present invention therefore may include multiple Points-of-Presence, distributed geographically including for example in areas requiring network service, and through the network architecture of the present invention bridging geographically disparate areas with improved network communication therebetween.

Additional Implementation Detail

As previously stated, the present invention may be implemented in connection with any technology for bonding or aggregating links, and thereby reduce long haul effects.

What follows is additional detail regarding link aggregation, which is one form of bonding/aggregation that may be used as part of the overall network solution and network architecture disclosed in this invention.

In one aspect of the invention, the system, method and network architecture may be implemented such that the aggregated/bonded network connections described are implemented using the link aggregation technology described in U.S. Pat. No. 8,155,158. What follows is further discussion of possible embodiments of the CPE and the server/concentrator (or concentrator) components previously described, emphasizing their creation and management of the bonded/aggregated connections between them, which in the network configuration of the present invention form a part of the overall network overlay that incorporates the one or more portions that are carried over the network backbone.

Diverse network connections may be aggregated into a virtual (logical) connections that provide higher throughput as well as independence of the network characteristics of the constituent (physical) network. Aggregation may be performed to a given CPE.

For instance, in one example of the implementation of the present invention a Metro Ethernet 10 Mbps (E10) link and a T1 (DS1) link are aggregated in accordance with the invention as described below, in order to provide higher fault tolerance and improved access speeds. The aggregation of diverse carriers in accordance may extend to any broadband network connection including Digital Subscriber Line (DSL) communications links, Data over Cable Service Interface Specification (DOCSIS), Integrated Services Digital Network, Multi protocol Label Switching, Asynchronous Transfer Mode (ATM), and Ethernet, etc. The network connections may also include a WAN.

According to one aspect of the invention, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, which transfers communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor, or in hardware, in a manner that is known to those skilled in the art.

In accordance with this aspect of the present invention, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection. Also, variation within transmission paths in a single provider network may lead to latency and/or jitter variations within a network connection.

Latency and jitter typically affect all data communication across the network connection. Latency, as is known to those skilled in the art, is the round-trip time for a transmission occurring end-to-end on a network connection. Jitter, as is known to those skilled in the art, is the variance in latency on a network connection for the same data flow. High latency and jitter typically have a direct and significant impact on application performance and bandwidth. Applications such as VOIP, and video delivery are typically highly sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In one aspect of the present invention, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In one aspect of the invention, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect of the invention, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present specification, routing protocols or route selection mechanisms described are intended only to provide an example but not to limit the scope of the invention in any manner.

Figure 3:
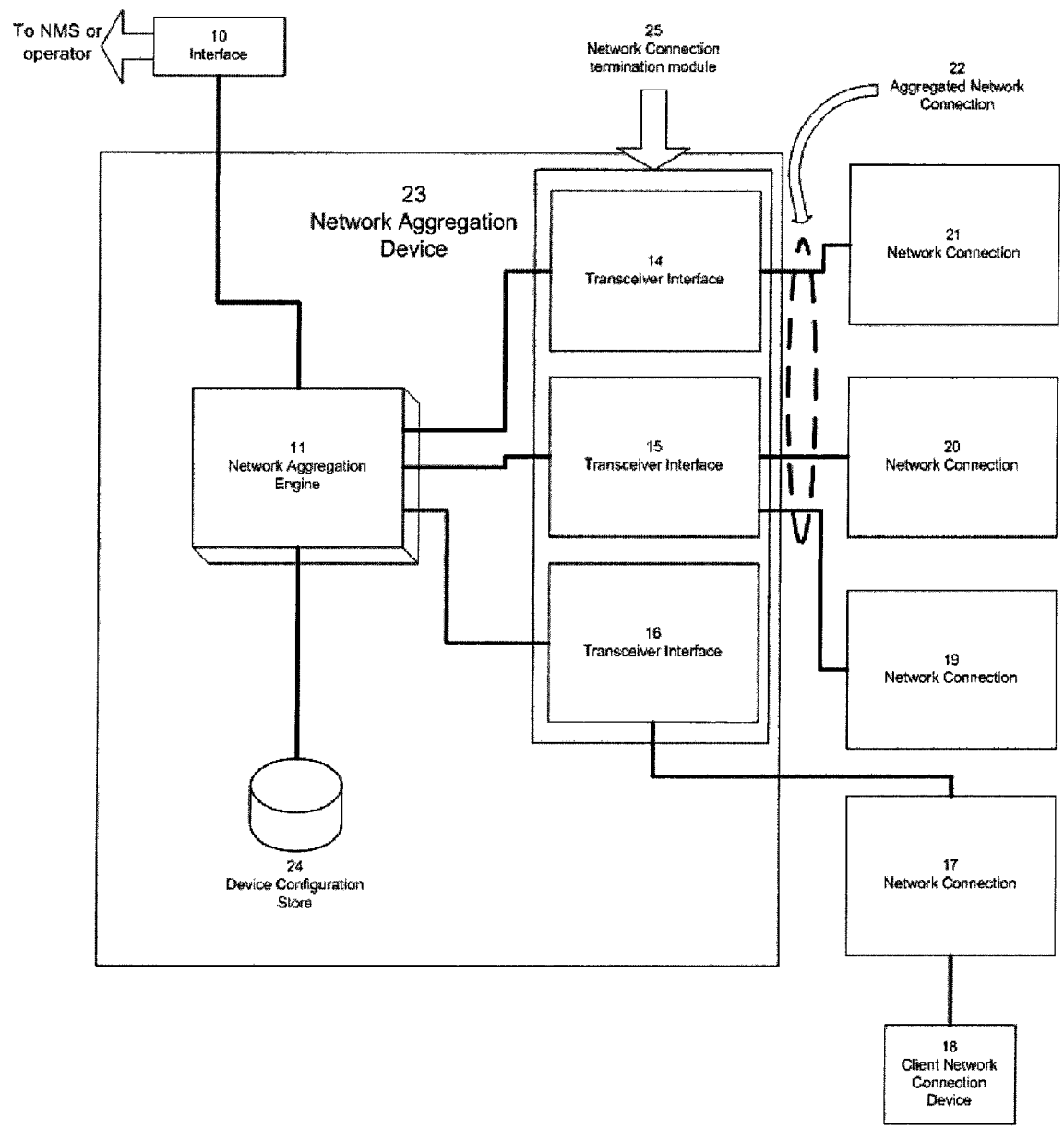
FIG. 3 is a block diagram of a communication device incorporating a particular embodiment of the invention, demonstrating the device as an aggregation means on the client/CPE side of a network connection.

FIG. 3 is a block diagram of a communication device incorporating a particular embodiment of the invention, demonstrating the device acting as a client.

As shown in FIG. 3, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. A device configuration store 24 may provide persistent data storage for device configuration information such as a network aggregation policy.

The network aggregation engine 11 may handle queries from external sources, such as configuration parameters a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In accordance with an aspect of the present invention, multiple network connections may be combined to form an aggregated network connection 22, as disclosed in further detail herein. Each individual network connection may be configured with a maximum communication traffic rate, which could be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25, in a manner that is known.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

The network aggregation engine 11 may poll the state of network connections 19, 20 and 21, for example as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 4:
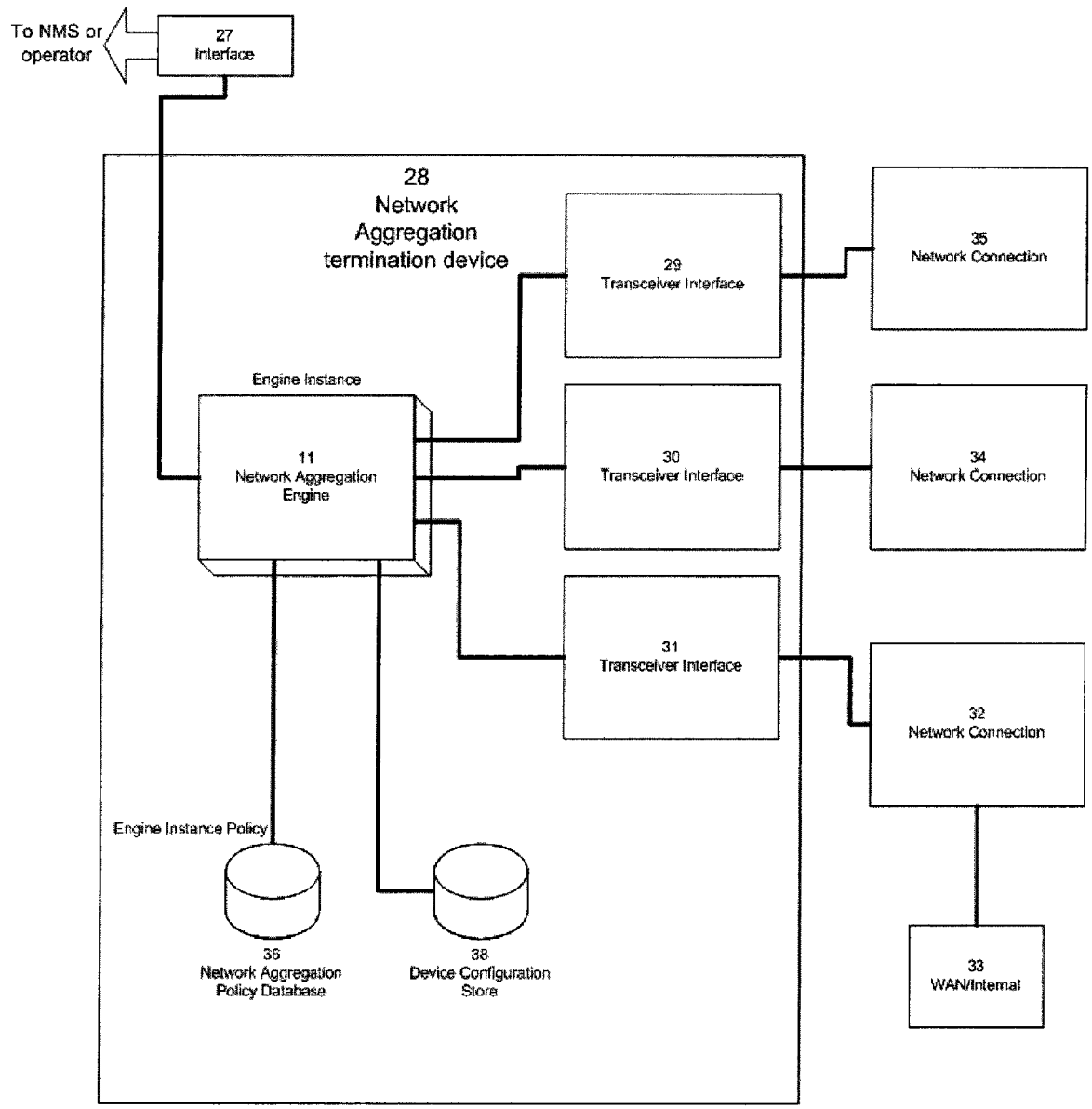
FIG. 4 is a block diagram of a communication device incorporating a particular embodiment of the invention, demonstrating the device as an aggregation means on the server/concentrator side of a network connection.

FIG. 4 is a block diagram of a communication device incorporating a particular embodiment of the invention, demonstrating the device acting as a server/concentrator.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE).

Figure 5:
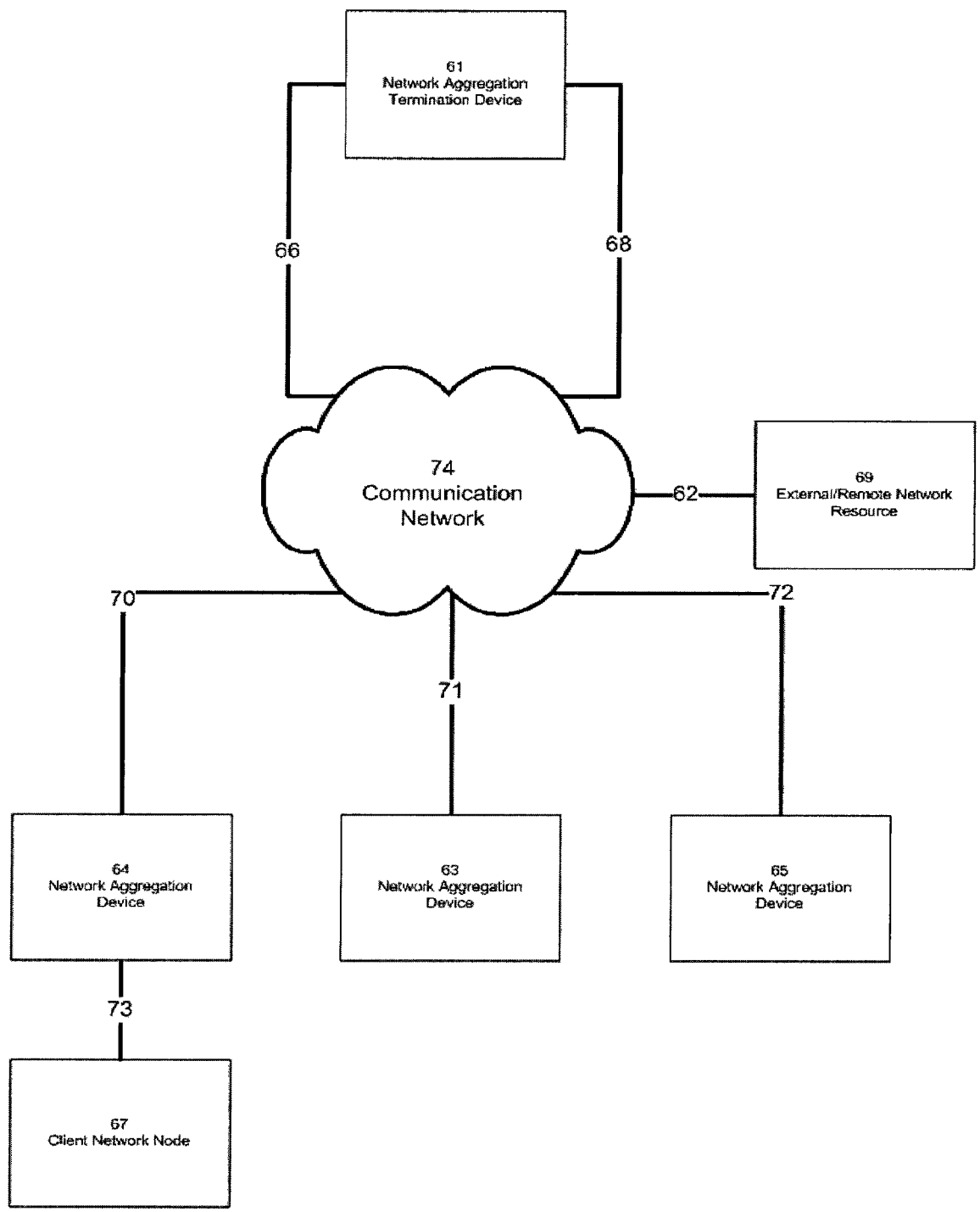
FIG. 5 is a block diagram of a communication network incorporating a particular embodiment of the invention, demonstrating the device as an aggregation means on both the client/CPE side and server/concentrator side of a network connection.

FIG. 5 is a block diagram of a communication network incorporating a particular embodiment of the invention, demonstrating the function of the device acting as a client/CPE and server/concentrator.

In accordance with a particular embodiment of the invention, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks may be provided by the aggregated network connection termination device 61 by using either network connection 66 or 68 through the use of a routing protocol, such as Border Gateway Protocol (BGP), Open Shortest Path (OSPF), or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its end point which is the aggregated network connection termination device 61. This may be done through the communication network 74 through the network connection 66 into the aggregated network connection termination device 61. Any data sent by the external/remote network resource 69 may be routed back through the aggregated network connection termination device.

A particular embodiment of this invention may use the Internet as the communication network 74 referenced in FIG. 5. However, the communication network 74 may alternatively be built by multiple sub-networks created through the use of multiple network aggregation devices 63, 64 and 65 with aggregated network connection termination device 61 end points through multiple network connections 66 and 68.

Figure 6:
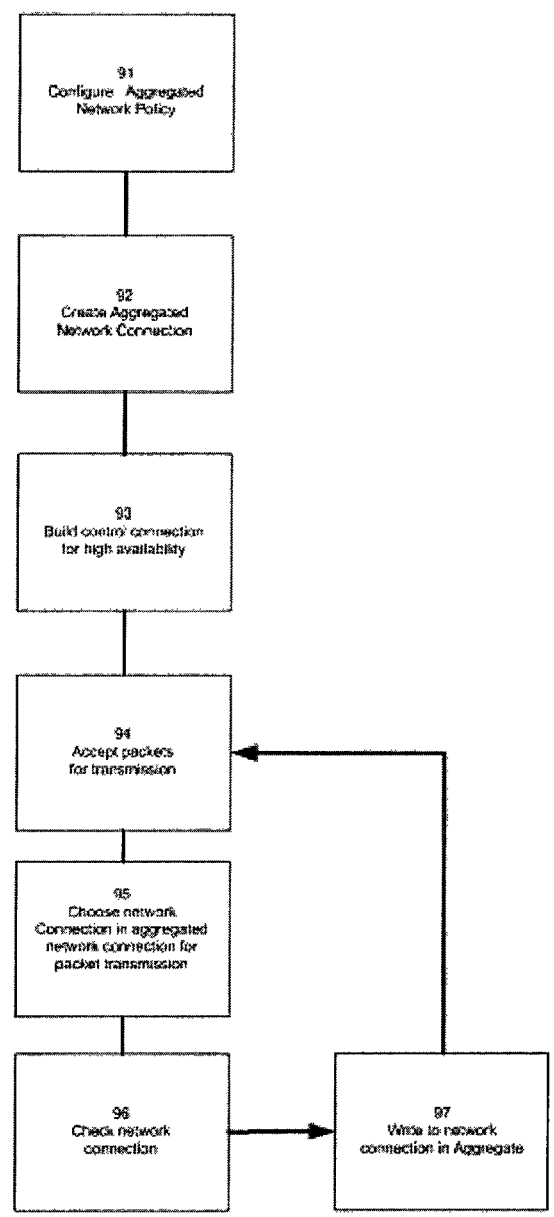
FIG. 6 is a flow diagram of a method of providing redundancy and increased throughput through a plurality of network connections in an aggregated network connection.

A further aspect of the invention relates to the provisioning of high availability over the aggregated network connection by the network aggregation engine 11. FIG. 6 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to one embodiment of the invention, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

Example in Operation

Figure 7A:
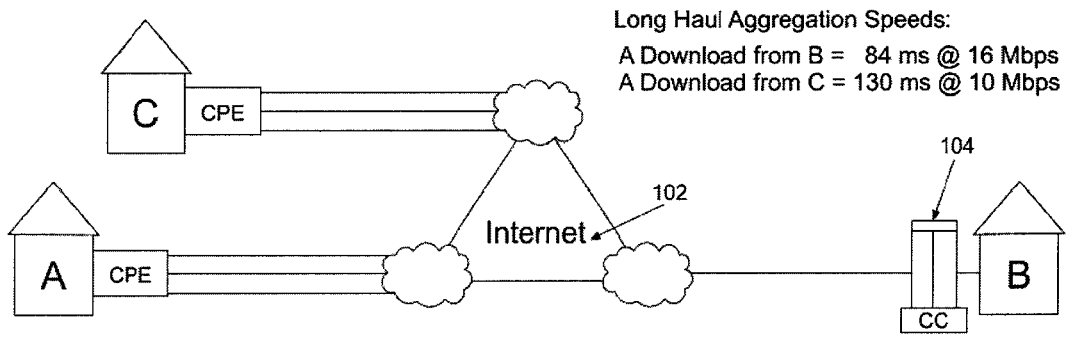
FIG. 7a illustrates a prior art network architecture where long haul effects apply, and presents network performance based on download speed.
Figure 7B:
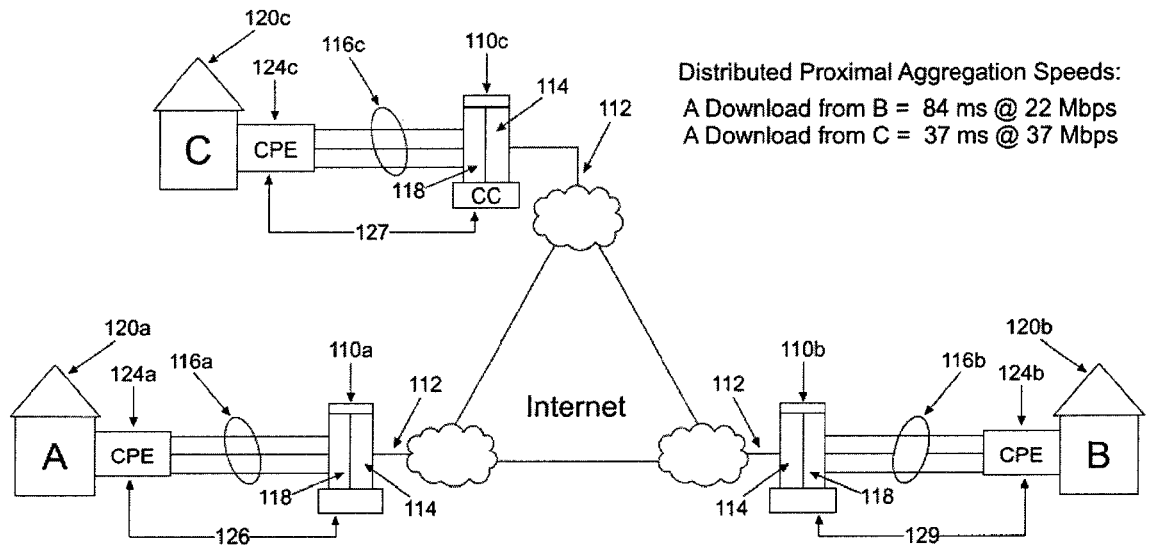
FIG. 7b illustrates, in similar network conditions as in FIG. 7a but implementing the present invention in order to reduce long haul bonding/aggregation, improved network performance based on faster download speed.

In one possible implementation of the present invention, 3 locations are provided namely Site A, Site B, and Site C, and Site D. FIGS. 7a and 7b illustrate network performance as discussed herein. FIG. 7a illustrates performance with long haul effects. FIG. 7b illustrates performance with reduction of long haul effects, based on the present invention in network conditions otherwise similar to those on which FIG. 7a is based.

FIG. 7b shows an improvement in performance over FIG. 7a, based on reduction of long haul effects in relatively long distance network communications are implemented using the network architecture.

The present invention therefore provides improved network performance relative to speed. A skilled reader will appreciate that the improvement in performance shown in significant. Other aspects of network performance are also improved, based on the present invention, for example latency.

Advantages and Use Case

The present invention significantly improves network performance between disparate locations by leveraging network bonding/aggregation technology, but by implementing a system, method and network configuration that provides intervening network components disposed adjacent to access points so as to manage traffic between two or more sites such that bonded/aggregated connections are terminated and traffic is directed to a network backbone, and optionally passed to one or more further bonded/aggregated connections associated with a remote additional site.

The network solutions of the present invention is flexible, responsive, scalable and easy to implement. New sites, optionally having their own CPE/concentrator can be easily added, and the network solution supports various types of multi-point network communications, and various network performance improvement strategies including various QoS techniques.

The network solution is easily updated with new programming or logic that is automatically distributed on a peer to peer basis based on the interoperation of network components that is inherent to their design, as previously described.

Network performance is significantly improved over prior art solutions as illustrated in the Example In Operation provided above.

The invention claimed is:

1. A network bonding/aggregation system for improving network communication performance between a first client site and a second client site, where the first client site and the second client site are at a distance from one another such that the distance would usually require long haul network communication, the system comprising:
  (i) at least one client site network component that is implemented at least at the first client site, the at least one client site network component bonding or aggregating a plurality of diverse network connections so as to configure a bonded/aggregated connection that has increased throughput; and
  (ii) at least one network server component, configured to interoperate with the at least one client site network component, the at least one network server component including a server/concentrator that is implemented at an access point to a high performing network;
  wherein the at least one client site network component and the at least one network server component are configured to interoperate so as to create and maintain a network overlay for managing network communications between the first client site and the access point, and wherein between the at least one client site network component and the at least one network server component data traffic is carried over the bonded/aggregated connection and between the access point and the second client site, the at least one network server component automatically terminates the bonded/aggregated connection and passes the data traffic to a network backbone of the high performing network, while maintaining management of the data traffic so as to provide a managed network path that incorporates both the bonded/aggregated connection and at least one network path carried over the high performing network, and thereby providing improved performance in long haul network connections between the first client site and the second client site.

2. The system of claim 1, wherein the managed network path is maintained between at least the first client site and the second client site without routing of network communications through a central server that increases long haul effects.

3. The system of claim 1, wherein the at least one client site network component and the at least one network server component include peer-to-peer programming and, based on said peer-to-peer programming, operate on a peer-to-peer basis.

4. The system of claim 1, wherein the at least one network server component is placed at a distance from the access point that does not result in long haul effects between the at least one network server component and the access point.

5. The system of claim 1, wherein a plurality of network server components are implemented in a geographic area so as to provide a Point-of-Presence (PoP) proximate the at least one client site network component.

6. The system of claim 5, wherein two or more Points-of-Presence are accessible to the at least one client site network component, and the at least one client site network component is configured to:
 (a) Collect network performance information; and
 (b) Initiate the configuration of the network overlay to include the at least one network server component so as to improve network communication performance.

7. The system of claim 5, comprising a network of Points-of-Presence, distributed geographically so as to serve a plurality of client locations each associated with a client site network component of the at least one client site network component.

8. The system of claim 1, wherein each network server component is accessible to a plurality of client site network components, each of the plurality of client site network components being associated with a client site.

9. The system of claim 1, comprising:
 (a) a client site network component at each of the first client site, and at the second client site;
 (b) a network server component proximal to each of the first client site and proximal to the second client site; wherein:
  data packets between the first client site's client site network component and associated network server component are bonded or aggregated, then terminated by the network server component associated with the first client site's client site network component, and passed to the high performing network;
  the data packets are received by the network server component associated with the second client site and transferred on a bonded or aggregated connection between the network server component associated with the second client site and the client site network component associated with the second client site.

10. The network-system of claim 1, further comprising a network aggregation device that: (A) configures the plurality of diverse network connections including dissimilar network connections or network connections provided by a plurality of diverse network carriers as one or more aggregated groups, each aggregated group creating an aggregated network connection that is a logical connection of the plurality of diverse network connections; and (B) routes and handles bi-directional transmissions over the aggregated network connection; wherein two or more of the plurality of diverse network connections have dissimilar network characteristics including variable path bidirectional transfer rates and latencies; wherein the logical connection is utilized for a transfer of data traffic bidirectionally on any of the plurality of diverse network connections without any configuration for the dissimilar network connections or by the diverse network carriers; and wherein the system comprises a network aggregation engine that includes or is linked to a network aggregation policy database, the network aggregation policy database including one or more network aggregation policies for configuring the one or more aggregated groups within accepted tolerances so as to configure and maintain the aggregated network connection so that the logical connection has a total data traffic throughput that is a sum of available data traffic throughputs of each of the one or more aggregated groups of the diverse network connections.

11. A computer-network implemented method for improving network communication performance between a first client site and a second client site, where the first client site and the second client site are at a distance from one another such that the distance would usually require long haul network communication, the method comprising:
 (a) bonding or aggregating a plurality of diverse network connections, by at least one client site network component implemented at the first client site, to form a bonded/aggregated connection that has increased throughput;
 (b) interoperating at least one network server component with the at least one client site network component, the at least one network server component including a server/concentrator that is implemented at an access point to a high performing network;
 (c) terminating the bonded/aggregated connection by the at least one network server component; and
 (d) transferring data traffic by the at least one network server component to the high performing network, for delivery to the second client site, while maintaining management of the data traffic so as to provide a managed network path that incorporates both the bonded/aggregated connection and at least one network path carried over the high performing network, thereby reducing long haul effects between the first client site and the second client site,
 wherein the at least one client site network component and the at least one network server component are configured to interoperate so as to create and maintain a network overlay for managing network communications between the first client site and the access point, and wherein between the at least one client site network component and the at least one network server component, the data traffic is carried over the bonded/aggregated connection and between the access point and the second client site, and the at least one network server component automatically terminates the bonded/aggregated connection and passes the data traffic to a network backbone of the high performing network.

12. The method of claim 11, wherein the managed network path is maintained between at least the first client site and the second client site without routing of network communications through a central server that increases long haul effects.

13. The method of claim 11, wherein the at least one client site network component and the at least one network server component include peer-to-peer programming and, based on said peer-to-peer programming, operate on a peer-to-peer basis.

14. The method of claim 11, comprising placing the at least one network server component at a distance from the access point that does not result in long haul effects between the at least one network server component and the access point.

15. The method of claim 11, comprising implementing a plurality of network server components in a geographic area so as to provide a Point-of-Presence (PoP) proximate the at least one client site network component.

16. The method of claim 15, wherein two or more Points-of-Presence are accessible to the at least one client site network component, and the at least one client site network component is configured to:
 collect network performance information; and
 initiate the configuration of the network overlay to include the at least one network server component so as to improve network communication performance.

17. The method of claim 15, comprising implementing a distributed network of Points-of-Presence geographically so as to serve a plurality of client locations each associated with a client site network component of the at least one client site network component.

18. The method of claim 11, wherein each network server component is accessible to a plurality of client site network components, each of the plurality of client site network components being associated with a client site.

19. The method of claim 11, wherein a client site network component is at each of the first client site and the second client site, and a network server component is proximal to, and associated with, each of the first client site and the second client site, the method comprising:

aggregating data packets between the first client site's client site network component and associated network server component;

terminating the data packets, by the network server component associated with the first client site's client site network component;

passing the data packets, by the network server component associated with the first client site's client site network component, to the high performing network;

receiving the data packets, by the network server component associated with the second client site; and transferring the data packets, on a bonded or aggregated connection between the network server component associated with the second client site and the client site network component associated with the second client site.

20. The method of claim 11, further comprising:

configuring, by a network aggregation device, the plurality of diverse network connections including dissimilar network connections or network connections provided by a plurality of diverse network carriers as one or more aggregated groups, each aggregated group creating an aggregated network connection that is a logical connection of the plurality of diverse network connections;

routing and handling bi-directional transmissions, by the network aggregation device, over the aggregated network connection; and storing one or more network aggregation policies for configuring the one or more aggregated groups, on a network aggregation policy database;

wherein two or more of the plurality of diverse network connections have dissimilar network characteristics including variable path bidirectional transfer rates and latencies; wherein the logical connection is utilized for a transfer of data traffic bidirectionally on any of the plurality of diverse network connections without any configuration for the dissimilar network connections or by the diverse network carriers; and wherein a network aggregation engine includes or is linked to the network aggregation policy database for configuring the one or more aggregated groups within accepted tolerances so as to configure and maintain the aggregated network connection so that the logical connection has a total data traffic throughput that is a sum of available data traffic throughputs of each of the one or more aggregated groups of the diverse network connections.

* * * * *